United States Patent [19]

Kiovsky et al.

[11] 3,945,945

[45] Mar. 23, 1976

[54] HIGH SURFACE AREA ALUMINA BODIES

[75] Inventors: Joseph R. Kiovsky; Jeffrey W. Meacham, both of Kent, Ohio

[73] Assignee: Norton Company, Worcester, Mass.

[22] Filed: Jan. 16, 1973

[21] Appl. No.: 324,106

Related U.S. Application Data

[63] Continuation-in-part of Ser. No. 142,004, May 10, 1971, abandoned.

[52] U.S. Cl. ............... 252/463; 423/626; 423/628
[51] Int. Cl.² .......................................... B01J 21/04
[58] Field of Search ............ 252/463; 423/626, 628

[56] References Cited

UNITED STATES PATENTS

| | | | |
|---|---|---|---|
| 1,871,793 | 8/1932 | Horsfield | 423/625 |
| 2,952,644 | 9/1960 | Holden | 252/463 X |
| 3,031,418 | 4/1962 | Bugosh | 423/625 X |
| 3,268,295 | 8/1966 | Armbrust, Jr. et al. | 423/626 X |
| 3,317,277 | 5/1967 | Cosgrove | 423/630 X |
| 3,357,791 | 12/1967 | Napier | 423/630 X |
| 3,403,111 | 9/1968 | Colgan et al. | 423/628 X |

*Primary Examiner*—W. J. Shine
*Attorney, Agent, or Firm*—Rufus M. Franklin

[57] ABSTRACT

High surface area alumina bodies for use as catalysts, catalyst carriers, and sorbents are made by controlled mixing of fine particle size platy boehmite alumina aggregates with a monobasic acid to produce non-pasty free-flowing particulate mass of aggregates of boehmite. This mass can then be formed by pressure into selected shapes such as rings, saddles, cylinders, solid, or hollow, or pellets, dried and fired to produce bodies of boehmite, gamma alumina, delta alumina, theta alumina or alpha alumina ranging in surface area of from 10 square meters per gram to greater than 300 square meters per gram. Catalytic metal can be included in the bodies by impregnation, before or after firing, or can be incorporated by inclusion in the aqueous acid treating solution.

3 Claims, No Drawings

HIGH SURFACE AREA ALUMINA BODIES

This application is a continuation-in-part of our co-pending U.S. application Ser. No. 142,004, filed May 10, 1971 and now abandoned.

FIELD OF THE INVENTION

This invention relates to self-bonded monolithic alumina bodies of high surface area and high purity for use as catalysts, catalyst carriers, sorbents, and other applications, and to methods of making such bodies.

BACKGROUND OF THE INVENTION

Alumina bodies produced by conventional ceramic techniques have long been used as catalysts, catalyst supports, sorbents, and heat exchangers. Until the present invention however, it has been impractical to produce high purity alumina hollow bodies or bodies having concave surfaces or surfaces of complex shape, having high internal surface areas, because of the weakness of such bodies produced by normal ceramic processing techniques. In particular we refer to such bodies having wall thickness less than 1/16 inch and a radius of curvature greater than ⅛ inch.

SUMMARY OF THE INVENTION

This invention provides a new high purity alumina body, of high surface area and which may be produced in complex or hollow shape, having sufficient strength for applications in chemical processing such as packed towers.

The superiority of the present invention is seen in the strength and purity of various shapes: i.e., pellets, saddles and rings of gamma alumina. The surface area of these bodies can be controlled over a wide range. The ranges of primary interest run from 10 to 100 and to 300 square meters per gram. Surface areas of this magnitude can be induced in bodies having physical strength and chemical purity greater than any other alumina product known to us with equivalent surface area. The ability to fabricate products having exceptional strength combined with high surface area and excellent purity allows us to make superior catalysts in the classical form of pellets. We can also make useful catalysts in the shape of saddles such as described in U.S. Pat. No. 2,639,909 which have heretofore been unavailable.

The use of high surface area alumina as a catalyst support of catalyst component is well documented in the technical literature and the patent literature. Ordinarily, metal salts are deposited on the extended surface of alumina. Such deposition can be done by impregnation, by precipitation and by spraying solutions of the metal salts onto the alumina particles. Ordinarily, such metal salt additions are made on gamma or eta alumina. The vast majority of commercial alumina catalysts are made on gamma alumina. The metal salts are subsequently broken down to yield metals or metal oxides. A common example of such a preparation is the impregnation of gamma alumina with nickel nitrate. The alumina is immersed in an aqueous solution of nickel nitrate; then removed and dried. The impregnated carrier is then heated to elevated temperatures to produce nickel oxide and $NO_2$ gas. Very often the nickel oxide is then reduced with hydrogen to nickel metal. The catalytic activity of metal alumina combinations of this type is dependent on the surface area and the metal content of the finished catalyst.

A second common catalytic composition involves the deposition of precious metals on high surface area gamma alumina. There are numerous patents describing the deposition of small amounts of platinum and palladium on high surface area alumina carriers. Catalysts containing from .01% to 2% platinum and palladium on gamma alumina are widely used in the petroleum and chemical industries.

An advantage of the present invention is that for a given surface area and chemical purity catalysts of exceptional strength can be produced. The bonding procedure we have invented also allows the manufacture of co-formed catalysts. The proper metal salts can be added to the alumina and a catalyst body formed by extrusion or other means. When such a body is fired, it maintains the high strength seen without metal salt additions. Catalysts have been made by this co-forming technique that have superior surface area and catalytic activity when compared to impregnated catalysts of equal metal content.

The starting material in the present invention, hereinafter referred to as microcrystalline boehmite is a boehmite having an agglomerate size less than 90 microns, average diameter, and crystallites less than about 750 angstroms in diameter, preferably less than 100 angstroms. The molar ratio of chemically combined water to alumina (as $Al_2O_3$) should be between 1.16 and 2.0, preferably between 1.2 and 1.6.

Suitable boehmites (i.e. microcrystalline boehmites) are further characterized by their ability to be dispersed by certain monobasic acids. The dispersability of any given sample of boehmite, and thus its active microcrystallinity, can be determined by treating the sample with dilute nitric acid, centrifuging the sample to separate the coarser crystals and agglomerates from the liquid, and measuring the light transmittance of the liquid. By the specific test described below the transmittance for active microcrystalline boehmite is less than 50 percent and preferably less than 20 percent.

The method for determining the transmittance is as follows:

1. Weigh a 3.0 gram sample into a 150 ml. beaker, add 25 ml. of 0.5 normal $HNO_3$, add a stirring bar and cover with a watch glass.
2. Place the beaker on a magnetic stirrer and stir for 10 minutes at a speed of 900 to 1100 rpm.
3. Transfer the contents of the beaker to a centrifuge bottle and dilute with distilled water to bring the volume to 90 ml.
4. Centrifuge the sample in a 9⅞ inch radius centrifuge at 1000 rpm for 20 minutes.
5. Measure the transmittance of the supernatent liquid in a 10 mm. test cell at a wavelength of 450 millimicrons, as a percent of the transmittance of distilled water.

Microcrystalline boehmites, conforming to the above specifications are available from various commercial sources and can be produced by the hydrolysis of aluminum alcoholates or by controlled crystallization of sodium aluminate solution in accordance with U.S. Pat. No. 3,268,295.

We have found that small quantities of various acids can be used to activate this alumina for formation into bodies with satisfactory green strength. Firing of these green bodies between 200° and above results in strong pure catalyst carriers useful in commerce. Of particular interest are firing temperatures between 200° and 1000° which produce carriers with surface areas between 10 and 300 square meters per gram. Products fired in this temperature range are primarily delta, theta, gamma alumina or boehmite or mixtures thereof. Firing to higher temperatures results in products with reduced surface areas and increasing amounts of alpha alumina. The following table lists acids that have proved to be useful bonding agents and those that are less useful.

| Useful Bonding Agents | Poor Bonding Agents |
| --- | --- |
| Hydrochloric Acid | Sulfuric Acid |
| Formic Acid | Phosphoric Acid |
| Acetic Acid | |
| Propanoic Acid | |
| Nitric Acid | |

Useful bonding agents are monobasic acids having an anion no larger than that of propanoic acid.

Subsequent examples will show that Catapal "S" or other commercially available microcrystalline boehmite can be bonded with small quantities of these useful bonding agents. While phosphoric acid is well known in the art to be a useful bonding agent for alumina, it is a surprising development that it is a poor bond for microcrystalline boehmite. We have also found that crushing some of the dried green alumina produced by acid bonding and including small percentages of this crushed dried product in the original mixture increases the strength of the final fired product.

An important feature of the mixing process in this invention is that the liquid and alumina be combined to produce a free-flowing particulate, not pasty or doughy, mix as indicated in the following examples. It is postulated that the individual platelets of boehmite in the particles are partially dispersed by the action of the acid, at any rate, dispersion of the platelets is promoted by acids of the preferred types.

The useful range of acid concentration for the invention is from 1 to 15 weight percent acid (acid/acid plus water). The useful range of water addition (including the water in the dilute acid) is from 20 to 100 parts for each 100 parts of as received alumina.

EXAMPLE 1

100 parts of Catapal S were added to a high intensity mixer (Hobart). To this was added 1 part of a cellulosic binder. In a separate vessel 2 parts of 90% formic acid and 60 parts water were mixed. The dilute acidic solution was then added to the dry ingredients in the mixer. Mixing was continued for about 30 seconds.

This short mixing time produced a free-flowing mixture, containing no separate liquid phase, of small spheroidal particles that were relatively dry to the touch. This mixture was then extruded and formed into ½ inch saddles. These saddles were air dried overnight; then placed in a furnace and heated to 700°C. The average crushing strength of the saddles in an inverted "U" position was 10 lbs.

EXAMPLE 2

A mixture as in Example 1 was made except that the mixing was carried on for several minutes until a pasty, moist dough was obtained. Attempts were made to extrude this dough without success.

When overmixed doughs are extruded by using special conditions, the resulting pellets or extrudates are badly laminated and easily crack along these laminations. Thus, overmixing to a doughy or pasty consistency is objectionable both from the standpoint of ease of forming and the fact that an inferior product is produced.

We visualize that the effect of the acid is to reduce the attraction between the platelets in the original alumina particles. In the case of Catapal S, these original particles range in size from about one micron to 40 microns in diameter with the average being between 15 and 25 microns.

Electron scanning micrographs show these particles to be agglomerates of small boehmite platelets. The effect of acid on these particles or agglomerates is to reduce the attraction between the platelets so that they are easily aligned by compaction. In this invention, a short intensive mixing step is required so that the realignment of the platelets occurs as the mix is compacted in the forming operation rather than during the mixing step. Extensive working in the mixer aligns and compacts these platelets into a dough that is hard to extrude and produces inferior product. In all the following examples, the mixing was conducted to produce a mix like that described in Example 1.

EXAMPLE 3

200 pounds of Catapal S were placed in a large high intensity mixer (Abbe). A mixture of 90% formic acid and water was sprayed into this mixture over a period of about 30 minutes. The amount of acid and water was such that 5 parts of 90% formic acid and 65 parts of water were added per 100 parts of Catapal S.

The resulting mixture was relatively dry and freeflowing and composed of small (approximately ⅛ inch) agglomerates of the original alumina particles. Some of these agglomerates were aggregated together and the lumps ranged from ½ to 5 inches in diameter. These larger aggregates were dry and could be broken up by hand into the smaller (approximately ⅛ inch) agglomerates.

Particular care was taken not to mix to a pasty or wet dough consistency. This mixture was extruded into ⅛ inch pellets. The pellets were dried overnight at room temperature; then fired to 500°C. The resulting product had an average flat plate crushing strength of 39 lbs.

EXAMPLE 4

A mixture of 100 parts Catapal S alumina and 10 parts cellulosic binder was placed in a high intensity mixer. 25 parts $Cu(NO_3)_2.3 H_2O$, 2 parts of concentrated formic acid and 70 parts water were mixed in a separate vessel to form an acidic copper nitrate solution. This solution was added to the alumina and mixed as in Example 1.

The resulting mixture was extruded and formed into ½ inch saddles. The resulting saddles were air dried; then fired to 500°C. The average crushing strength of these saddles was 16 lbs. with a surface area of 210 square meters per gram. Note the excellent strength of these catalyst pieces compared to the alumina pieces without added copper.

EXAMPLE 5

A mixture of 100 parts Catapal S alumina and 10 parts cellulosic binder was placed in a high intensity mixer. In a separate vessel, 2 parts concentrated nitric acid were mixed with 70 parts water. The acidic solution was mixed with the alumina as in Example 1. The resulting mixture was extruded and formed into ½ inch saddles. These saddles were air dried and fired to 500°C. The fired saddles were then impregnated with a solution of copper nitrate to a final copper content equal to that in Example 6 and refired to 500°C. Their final average crushing strength was 6 lbs. with a surface area of around 160 square meters per gram. Note that this catalyst made by impregnation is inferior both in crushing strength and surface area to a similar catalyst made by the co-forming technique described in Example 4.

EXAMPLE 6

A mixture of 100 parts Catapal S and 5 parts cellulosic binder was placed in a high intensity mixture. 75 parts $Ni(NO_3)_2 \cdot 6 H_2O$ and two parts concentrated nitric acid were mixed with 65 parts water. This acidic nickel nitrate solution was mixed with the dry ingredients as in Example 1.

The resulting mixture was extruded, air dried and fired in air at 500°C and then fired in hydrogen at 300°C. The average crushing strength of the final product was 12 lbs. with a surface area of about 200 square meters per gram.

EXAMPLE 7

A mixture of 100 parts Catapal S and 5 parts cellulosic binder was placed in a high intensity mixer. In a separate vessel 2 parts concentrated nitric acid was mixed with 65 parts water. This acidic solution was then mixed with the dry ingredients as in Example 1. The resulting mixture was extruded and formed into ½ inch saddles.

The saddles were air dried; then fired at 500°C. Next they were dipped into a solution of nickel nitrate to an identical pickup as obtained in the previous example, and refired to 500°C in air and 300°C in hydrogen. The final average crushing strength of these impregnated saddles was about 2 lbs. with a surface area of about 160 square meters per gram. In this example and the previous one, we again see the superiority of adding the catalytic components to the mixture before extrusion over the common impregnation method.

EXAMPLE 8

A mixture of 75 parts Catapal S, 25 parts Kaiser KCSA-M alumina and 2 parts cellulosic binder was placed in a high intensity mixer. In a separate vessel 2 parts 90% formic acid were combined with 75 parts water. This acidic solution was added to the dry ingredients as in Example 1. To this mix 2 parts of grease were added as an extrusion aid.

The resulting mixture was extruded and formed into ½ inch saddles. The saddles were air dried; then fired at 537°C. The resulting surface area was 221 square meters per gram with an average flat plate crushing strength of 12 lbs.

EXAMPLE 9

A mixture of 75 parts Catapal S and 25 parts KCSA-M a boehmite available from Kaiser Chemical Company was added to a high intensity mixer. In a separate vessel a solution of 4 parts concentrated nitric acid, 15.85 parts copper nitrate, 8.02 parts chromium oxide and 62.5 parts water was prepared. This solution was added to the dry ingredients and mixed as in Example 1.

The resulting mixture was then extruded into ½ inch saddles that were air dried and fired at 500°C. Their surface area was 206 square meters per gram with an average flat plate crushing strength of 21 lbs.

EXAMPLE 10

100 parts KCSA-M alumina were placed in a high intensity mixer. In a separate vessel a solution of 2 parts 90% formic acid was combined with 90 parts water. This acidic solution was then added to the dry ingredients as in Example 1. From this mixture ¼ × ¼ pellets were extruded. These pellets were air dried and fired at 500°C. Surface area was 274 square meters per gram with an average flat plate crushing strength of 66.5 lbs.

EXAMPLE 11

A mixture of 100 parts Catapal S and 12 parts cellulosic binder was placed in a high intensity mixer. In a separate vessel, 2 parts 90% formic acid were combined with 58 parts water. This solution was then added to the dry ingredients as in Example 1. To the resulting mixture one part grease was added and mixing continued for an additional 15 seconds to disperse the grease.

The resulting mixture was then extruded into ¼ × ¼ pellets. These pellets were air dried; then oven dried at 105°F. They were then fired at 500°C. The resulting surface area was 247 square meters per gram with a flat plate crushing strength of 26 lbs.

EXAMPLE 12

A mixture of 70 parts Catapal S boehmite and 32 parts KCSA-M boehmite was placed in a high intensity mixer. In a separate vessel, a solution of 8 parts concentrated nitric acid and 80 parts water was prepared. This acidic solution was then added to the dry ingredients as in Example 1.

The resulting mixture was extruded into ¼ × ¼ pellets. These pellets were air dried and oven dried at 105°F. They were they calcined at 500°C. The resulting surface area was 217 square meters per gram with a flat plate crushing strength of 125 lbs.

EXAMPLE 13

A mixture of 70 parts Catapal S and 32 parts KCSA-M was placed in a high intensity mixer. In a separate vessel, a solution of 4 parts concentrated nitric acid and 80 parts water was prepared. This acidic solution was then added to the dry ingredients as in Example 1.

The resulting mixture was extruded into ¼ × ¼ pellets. These pellets were air dried and oven dried at 105°F. They were then calcined at 500°C. The resulting surface area was 216 square meters per gram with a flat plate crushing strength of 99 lbs.

What is claimed is:

1. A method for bonding platy particulate boehmite to produce monolithic bodies having a surface area between 10 and 300 square meters per gram for use as catalysts, catalyst carriers and adsorbents comprising:

mixing microcrystalline boehmite with a dilute aqueous solution of monobasic acid in which the anion has a ionic size no larger than that of propanoic acid to promote the dispersion of the boehmite into platelets and to form a free flowing mixture consisting of spheroidal aggregates and being relatively dry and uncompacted; and forming bodies by compaction prior to any significant rebonding of said dispersed platelets and drying and firing said compacted bodies.

2. A method as in claim 1 in which the acid is formic acid or nitric acid.

3. A self-bonded strong monolithic polycrystalline curved shape having concave surface, having a surface area from 10 to 300 square meters per gram and having a wall thickness of less than 1/16 inch combined with a wall radius of curvature of greater than 1/8 inch, produced by mixing a powder consisting of aggregates of platy micro-crystalline boehmite alumina crystals having an aggregate size of under 100 microns, with a dilute aqueous monobasic acid; continuing mixing until a free-flowing mass of spheroidal catalyst-impregnated spherules of micro-crystalline boehmite is produced; forming said mix by pressure into discrete shaped bodies; and drying and firing said shaped bodies.

* * * * *

UNITED STATES PATENT OFFICE
CERTIFICATE OF CORRECTION

Patent No. 3,945,945   Dated March 23, 1976

Inventor(s) Joseph R. Kiovsky and Jeffrey W. Meacham

It is certified that error appears in the above-identified patent and that said Letters Patent are hereby corrected as shown below:

Column 6, line 17;  "12 parts" should read - 2 parts -

Column 6, line 39;  "they" second occurance should read - then -

Column 7, line 3;   after "polycrystalline" the word - alumina - should be inserted Signed and Sealed this eighth Day of June 1976

[SEAL]

Attest:

RUTH C. MASON
Attesting Officer

C. MARSHALL DANN
Commissioner of Patents and Trademarks